United States Patent [19]

Ando et al.

[11] Patent Number: 4,920,788
[45] Date of Patent: May 1, 1990

[54] ROTATION VARIATION TESTING MACHINE

[75] Inventors: Masakatsu Ando, Kobe; Minori Kawaguchi, Miki; Susumu Yamakawa, Kobe, all of Japan

[73] Assignee: Mitsuboshi Belting Ltd., Kobe, Japan

[21] Appl. No.: 273,941

[22] Filed: Nov. 21, 1988

[51] Int. Cl.⁵ .......................................... G01M 19/00
[52] U.S. Cl. .................................................. 73/118.1
[58] Field of Search ................... 73/865.6, 118.1, 862, 73/862.08, 862.09, 622; 318/490

[56] References Cited

U.S. PATENT DOCUMENTS 4,807,467 2/1989 Kugler ............................ 73/118.1

FOREIGN PATENT DOCUMENTS 142438 11/1981 Japan .
145758 6/1986 Japan .
117792 11/1988 Japan .
1286920 1/1987 U.S.S.R. ........................... 73/118.1

Primary Examiner—Jerry W. Myracle
Attorney, Agent, or Firm—Wood, Phillips, Mason, Recktenwald & Vansanten

[57] ABSTRACT

Apparatus for testing a power transmission drive intended for use with a reciprocating engine by use of an electric drive motor in lieu of the engine. The motor is provided in an adjustable input shaft driving unit which provides a variable speed drive of the power transmission drive correponding to a variable speed drive effected by a reciprocating engine. In one form, the drive speed is varied by a controlled brake which, in the illustrated embodiment, is an eddy current brake. The brake may be utilized in conjunction with a variable speed input shaft driving unit for providing a second speed variation or may be used independently thereof. Alternatively, the electric motor may be operated by a control arranged to provide a speed variation of the electric motor corresponding accurately with the reciprocating engine characteristics. Control circuitry for effecting the desired brake control and motor control are disclosed.

30 Claims, 3 Drawing Sheets

ROTATION VARIATION TESTING MACHINE

TECHNICAL FIELD

This invention relates to testing apparatus and in particular to an apparatus for testing a power transmission drive intended for use with a reciprocating engine.

BACKGROUND ART

In one known form of power transmission drive, the drive is intended for connection to a reciprocating engine as the prime mover. In testing such drives, however, the prime mover is conventionally an electric motor which permits such testing with improved safety, reduced noise and improved adjustability and control of the operating characteristics.

A problem arises, however, in the testing of drive systems by substitution of the relatively constant speed electric motor for the reciprocating engine in that the stresses loaded on the drive are not the same because of the lack of the periodic variation in the drive forces and speed.

One attempted solution to this vexatious problem has been the use of a universal joint connected between the electric motor and input shaft of the drive. The universal joint is connected at an angle so as to provide a variable output speed which varies, to some extent, similarly to that of the reciprocating engine.

Such prior testing apparatuses have further included means for adjusting the angularity of the universal joint so as to adjust the speed variations produced by the system in testing the power transmission drive.

Another problem found in the testing apparatus of the prior art is caused by the characteristics of the drive, which itself may have reciprocating components so as to provide periodically variable load characteristics. Illustratively, the load torque may vary as to pressure angle as a result of the rotation of a cam, or as a result of variable compression and exhaust, such as in a gas compressor.

DISCLOSURE OF INVENTION

The present invention comprehends an improved apparatus for testing a power transmission drive including means for more accurately simulating the output characteristics of a reciprocating engine while using, as the drive means, an electric motor.

More specifically, the invention comprehends the provision in an apparatus for testing a power transmission drive intended for use with a reciprocating engine having a periodically varying angular velocity, the apparatus including an electric drive motor having an output shaft and means for connecting the output shaft to the power transmission drive to be tested, braking means and control means for causing the braking means to apply a periodically varying braking force to the power transmission drive to simulate the variable application of force to the drive and resultant variable speed of the drive by a reciprocating engine in testing the drive by means of the electric drive motor.

The invention comprehends the provision of such a testing apparatus further including a universal joint connected between the motor and the drive to provide a second periodic speed variation in the driving of the drive by the motor coordinated with the speed variation caused by the periodically varying braking force.

In the illustrated embodiment, the drive includes an input drive shaft and an output load shaft, the motor being connected to the input drive shaft and the brake being connected to the load shaft.

Means are provided for adjusting the periodic speed variation provided by the brake and by the universal joint connection.

Other forms of substantially constant speed prime movers may be utilized in lieu of the electric motor, and other forms of supplemental speed retardation of the drive may be provided in lieu of the braking means.

In the illustrated embodiment, the braking means comprises an eddy current brake and the control means includes a speed sensor and means responsive to the speed sensor for varying the excitation of the eddy current brake.

In the illustrated embodiment, the control means comprises an adjustable pulse generator.

The invention further comprehends that the speed varying means may comprise means for varying the speed of the electric motor in lieu of the universal joint means.

The testing apparatus of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
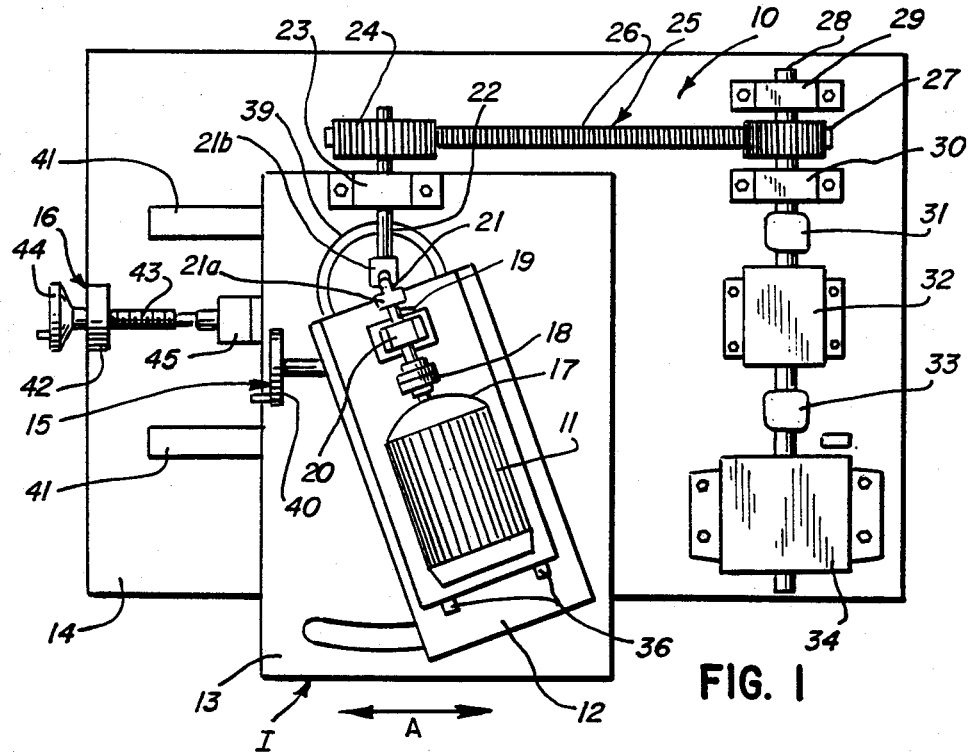
FIG. 1 is a plan view of a testing apparatus embodying the invention.
Figure 2:
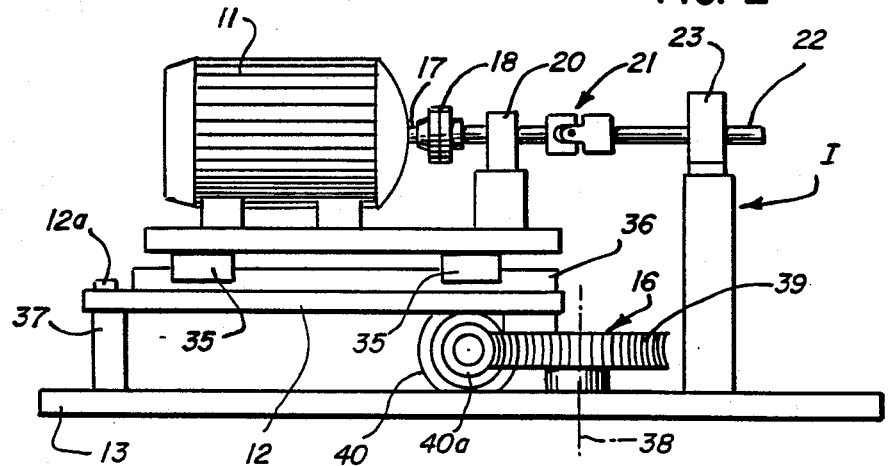
FIG. 2 is a side elevation of the input drive mechanism thereof.
Figure 3:
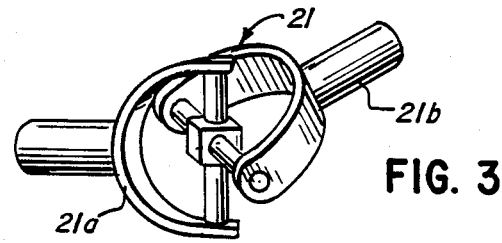
FIG. 3 is a perspective view of a universal joint for use therein.

In the illustrative embodiment of the invention as disclosed in the drawing, a testing apparatus generally designated 10 is shown to comprise an input shaft driving unit I having an electric motor 11 carried on a mounting member, or plate, 12 angularly adjustably mounted to a support member, or plate, 13 which, in turn, is slidably reciprocably adjustably mounted to a base 14.

The angular position of the mounting plate 12 on the support plate 13 is adjusted by a manually operable pivot means 15. The disposition of the support plate 13 on the base 14 is reciprocably adjustable by means of a manually operable adjusting means 16.

The output shaft 17 of the motor is connected through a coupling 18 to a shaft 19 journaled in a bearing 20 to a universal joint 21 having an input portion 21a and an output portion 21b. The output portion 21b is connected through a shaft 22 journaled in a bearing 23 to a drive pulley 24 of the power transmission drive 25 to be tested.

By varying the angular position of the mounting plate 12 on the support plate 13 by the adjusting means 15, variable angularity of the input and output portions 21a and 21b of the universal joint may be effected so as to provide a variable output speed from the electric motor 11 to the drive pulley 24.

In the illustrated embodiment, drive 25 includes a power transmission belt 26 connected between the drive pulley 24 and a driven pulley 27 carried on a load shaft 28. The load shaft is journaled in a pair of bearings 29 and 30 at opposite sides of the driven pulley. The load shaft is connected by a coupling 31 to a torque detector 32 which, in turn, is connected through a coupling 33 to a brake 34 mounted to the base 14.

Adjusting means 16 effects a movement of the support plate on a pair of slide bearings 35 on guide rails 36 for adjusting the disposition of the shaft 22 relative to the drive 25.

One end of the support plate 13 is carried in an arcuate upright support 37 centered on an axis 38 of a worm wheel 39 defining the center of angular adjustment of the support plate. Suitable securing means, such as bolts, 12a may be provided for locking the support plate to the upright support 37 in the adjusted position wherein the angularity of the universal joint 21 is preselected. As shown in FIG. 1, the adjusting means includes a manually operable handle 40 having associated therewith a worm gear 40a for effecting desired rotation of worm wheel 39 in controlling the angularity of the universal joint.

In the illustrated embodiment, the means for adjusting the disposition of the support plate 13 on base 14 includes linear bearings 41, a threaded support 42 carried by the base 14, and a threaded rod 43 extending through the support 42 and provided at its outer end with a rotatable handle 44. The opposite end of rod 43 is connected through a load cell 45 to the support plate.

Figure 4:
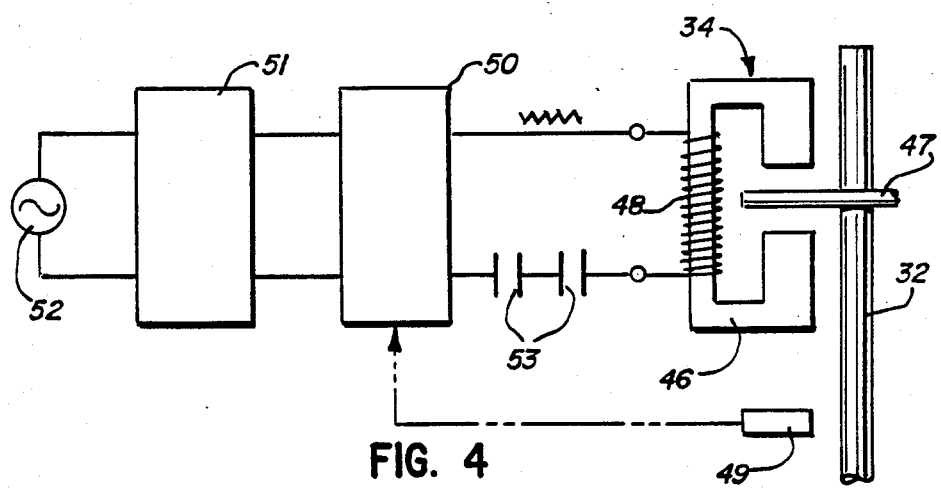
FIG. 4 is a schematic diagram of the control associated with the brake of the testing apparatus.

In the illustrated embodiment, brake 34 comprises an eddy current brake which, as seen in FIG. 4, includes an eddy current ring 46, a rotor 47, and an excitation coil 48 wound about a portion of the ring 46. The speed of shaft 32 on which the rotor is mounted is detected by a rotation sensor 49 which provides a speed signal to a conventional pulse generator 50, which is energized through a rectifier 51 from a conventional alternating current power supply 52.

As shown in FIG. 4, the output of the pulse generator comprises a saw-toothed current provided to the eddy current excitation coil. Switch contacts 53 may be provided for controlling the delivery of current to the coil.

It has been found that by providing the controlled saw-toothed current to the excitation coil, a speed retardation of the shaft 32 may be effected to simulate accurately the characteristics of a reciprocating engine.

Figure 5:
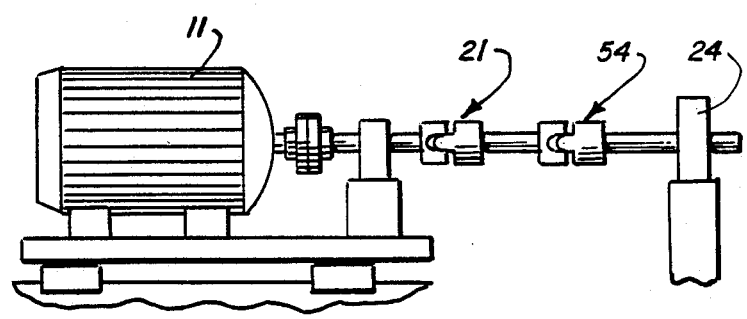
FIG. 5 is a side elevation of a modified form of testing apparatus embodying the invention.

As illustrated in FIG. 5, a second universal joint 54 may be connected in series with the universal joint 21 between the motor 11 and drive pulley 24 to provide further controlled periodic speed variations in the drive of the pulley 24 from the motor. The invention comprehends that such plurality of angled universal joints may be utilized independently of the provision of the brake means discussed above.

When a plurality of such universal joints is connected in series between the motor and drive pulley, the angular velocity change may be increased. However, the angles formed between the two universal joints and the inputs and outputs thereto should be dissimilar. Alternatively, the joints may be disposed in different plane.

Figure 6:
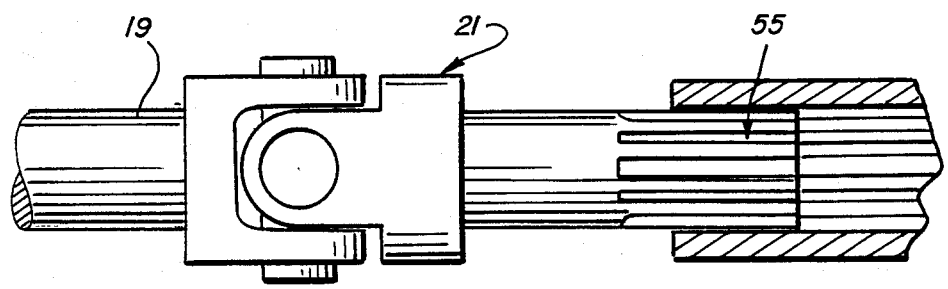
FIG. 6 is a fragmentary side elevation showing a spline connection of the universal joint in greater detail.

To accommodate variable positioning of the universal joint, the connection of the universal joint to the drive pulley may be effected by means of a spline connection generally designated 55, as shown in FIG. 6.

Figure 7:
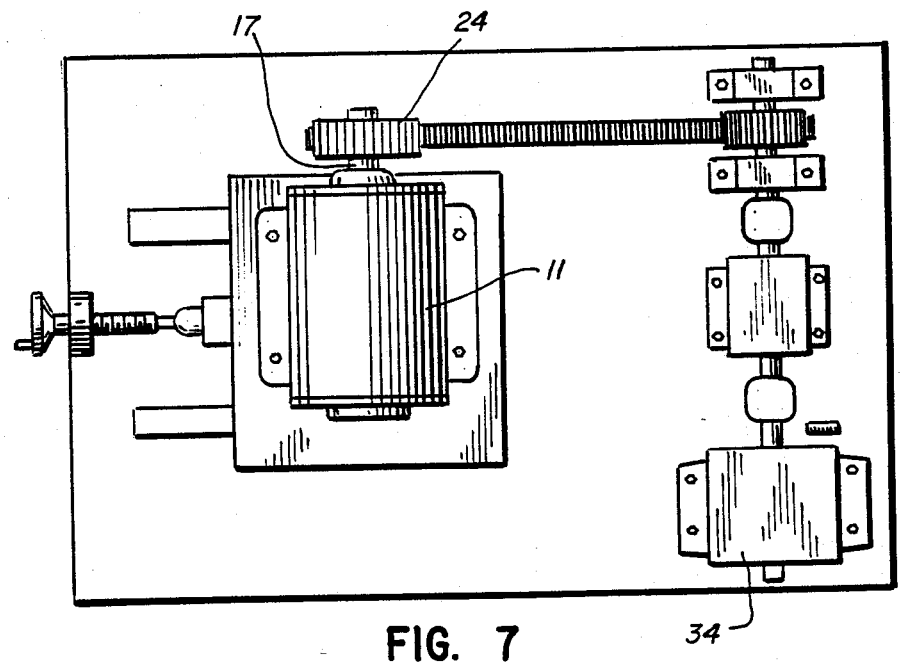
FIG. 7 is a plan view illustrating a modified form of the invention wherein the universal joint is omitted.

As illustrated in FIG. 7, the brake 34 may be utilized without the universal joint by coupling the output shaft of the motor 11 directly to the drive pulley 24.

Figure 8:
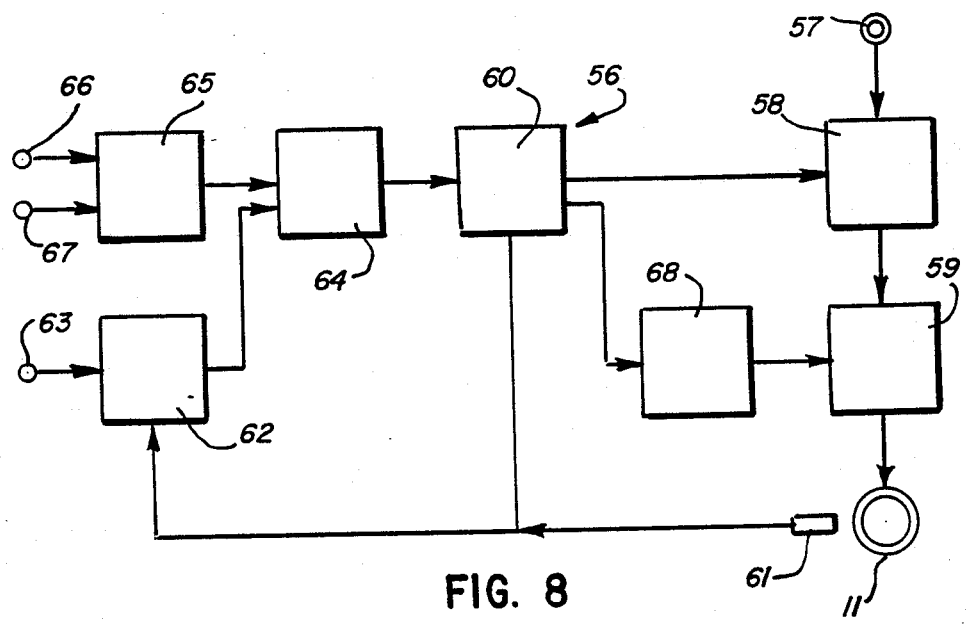
FIG. 8 is a schematic diagram illustrating a modified form of the invention including control means for varying the speed of the electric motor to correspond accurately to the variable speed of the reciprocating engine intended to drive the drive means being tested.

The invention further comprehends that the desired speed variation of the drive being tested be effected by controlling the motor itself. Thus, as seen in FIG. 8, the speed of motor 11 is controlled by a control generally designated 56. The control is energized from a DC power source 57. The control includes a current amplifier 58 for varying the current delivered through an inverter 59 to the motor. The inverter comprises a conventional current-, frequency- and phase-controlled inversion of the direct current. The speed of the motor is sensed by a speed sensor 61 and is connected to the vector controller 60 and a deviation amplifier 62. The deviation amplifier includes a speed setter 63 which sets the amplifier for a preselected desired speed. The deviation amplifier 62 amplifies the difference between these signals and provides an output to an adder 64. A pulse signal generator 65 provides a pulsed signal to the adder and includes a frequency setter 66 and an amplitude setter 67 for controlling the frequency and amplitude of the pulsed signal delivered from the generator 65 to the adder.

The output of the adder is delivered to the vector controller which calculates the necessary increase or decrease in the current characteristics delivered to the motor 11 through the inverter 59 as a function of both of the output of the adder 64 and the speed sensor 61. An inverter controller 68 controls the inverter 59 by inputting a frequency command signal and phase command signal from the vector controller 60, with the current command signal being delivered to the current amplifier 58, as shown in FIG. 8.

Thus, the invention comprehends the provision of a number of different embodiments for effecting a simulation of a reciprocating engine in the driving of a power transmission drive to be tested by means of an electric motor. Where the universal joints are utilized, the Cardan error of the universal joint provides a periodic variation in the speed which is coordinated with the periodically variable braking effect of the brake to provide a close simulation to the characteristics of the conventional reciprocating engine. Thus, a simple electric motor may be utilized obviating the need for using an actual reciprocating engine or cam drive, while yet an effective accurate testing of the power transmission drive is effected.

The invention comprehends the control of the brake as a sole means for effecting the speed variation when desired.

Alternatively, the invention comprehends that the desired periodic variable speed may be effected by suitable electronic control of the electric motor.

As discussed above, the different methods of providing periodic variation in the speed of the drive may be used individually or in combination within the broad scope of the invention.

The utilization of a plurality of the universal joints in the manner discussed above provides a substantial improvement in the simulation of the reciprocating engine and, thus, similarly may be utilized without or with the braking control, as discussed above.

The control of the electric motor may be effected simply by periodically varying the input voltage of a DC motor for varying the frequency of an input power source provided for driving an induction motor. The indicated circuitry detects the rotating speed of the motor and compares the detected value with the set value. The rotating speed may be calculated from the frequency variations and the motor may be energized where an input current corresponds to the compared value in addition to the periodic pulsation of the frequency.

The adjustable mounting of the testing apparatus on the base permits controlled tensioning of the belt where the power transmission drive comprises a belt drive. In conducting the test, the belt is firstly properly tensioned and the desired periodic variation in the speed effected as discussed above.

The foregoing specific embodiments of the invention are illustrative of the broad inventive concepts comprehended by the invention.

We claim:

1. A testing apparatus for testing a power transmission drive intended for use with a reciprocating engine having a periodically varying angular velocity, said apparatus comprising
   an electric drive motor having an output shaft;
   means for connecting said output shaft to the power transmission drive to be tested;
   braking means; and
   control means for causing said braking means to apply a periodically varying braking force to the power transmission drive to simulate the variable application of force to the drive and resultant variable speed of the drive by a reciprocating engine in testing the drive by means of the electric drive motor.

2. The testing apparatus of claim 1 wherein a universal joint is connected between said motor and said drive to provide a second periodic speed variation in the driving of said drive by said motor coordinated with the speed variation caused by the periodically varying braking force to cooperatively simulate said variable application of force to the drive by a reciprocating engine.

3. The testing apparatus of claim 1 wherein said drive includes an output load shaft and said brake is connected to said load shaft.

4. The testing apparatus of claim 1 wherein said drive includes an input drive shaft and an output load shaft, said motor being connected to said input drive shaft and said brake being connected to said output load shaft.

5. The testing apparatus of claim 1 wherein a universal joint is connected between said motor and said drive to provide a second periodic speed variation in the driving of said drive by said motor coordinated with the speed variation caused by the periodically varying braking force to cooperatively simulate said variable application of force to the drive by a reciprocating engine and means are provided for adjusting the periodic speed variation provided by said brake.

6. The testing apparatus of claim 1 wherein a universal joint is connected between said motor and said drive to provide a second periodic speed variation in the driving of said drive by said motor coordinated with the speed variation caused by the periodically varying braking force to cooperatively simulate said variable application of force to the drive by a reciprocating engine and means are provided for adjusting the periodic speed variation provided by said universal joint.

7. The testing apparatus of claim 1 wherein a universal joint is connected between said motor and said drive to provide a second periodic speed variation in the driving of said drive by said motor coordinated with the speed variation caused by the periodically varying braking force to cooperatively simulate said variable application of force to the drive by a reciprocating engine and means are provided for adjusting the periodic speed variation provided by said universal joint and by said brake.

8. A testing apparatus for testing a power transmission drive intended for use with a reciprocating engine having a periodically varying angular velocity, said apparatus comprising:
   a constant speed prime mover having an output shaft;
   means for connecting said output shaft to the power transmission drive to be tested;
   speed retarding means; and
   control means for causing said speed retarding means to apply a periodically varying braking force to the power transmission drive to simulate the variable application of force to the drive and resultant variable speed of the drive by a reciprocating engine in testing the drive by means of the constant speed prime mover.

9. The testing apparatus of claim 8 wherein a speed varying means is associated with said drive for periodically varying the speed of the drive.

10. The testing apparatus of claim 8 wherein a speed varying means is associated with said drive for periodically varying the speed of the drive, said speed varying means comprising means connected between said prime mover and said drive.

11. The testing apparatus of claim 8 wherein a speed varying means is associated with said drive for periodically varying the speed of the drive, said speed retarding means and speed varying means being connected to different portions of the drive.

12. The testing apparatus of claim 8 wherein a speed varying means is associated with said drive for periodically varying the speed of the drive, said drive including an input shaft and an output shaft, said speed retarding means being connected to said output shaft and said speed varying means being connected to said input shaft.

13. The testing apparatus of claim 8 wherein said speed retarding means comprises a brake.

14. The testing apparatus of claim 8 wherein said speed retarding means comprises an eddy current brake.

15. The testing apparatus of claim 8 wherein said control means includes a speed sensor for sensing the rotational velocity of the drive.

16. The testing apparatus of claim 8 wherein said speed retarding means comprises an eddy current brake, said control means including a speed sensor for sensing the rotational velocity of the drive, and means responsive to said speed sensor for varying the excitation of the eddy current brake.

17. The testing apparatus of claim 8 wherein said speed retarding means comprises an eddy current brake, said control means including a speed sensor for sensing the rotational velocity of the drive, and pulse generator means responsive to said speed sensor for varying the excitation of the eddy current brake.

18. The testing apparatus of claim 8 wherein a speed varying means is associated with said drive for periodically varying the speed of the drive, said speed varying means comprising means for varying the speed of the electric motor.

19. The testing apparatus of claim 8 wherein a plurality of angled universal joints are serially connected between said prime mover and said power transmission drive.

20. A testing apparatus for testing a power transmission drive intended for use with a reciprocating engine having a periodically varying angular velocity, said apparatus comprising:
   an electric drive motor powered by a supply and having an output shaft;
   means for connecting said output shaft to the power transmission drive to be tested; and
   control means for varying the speed of the electric motor without varying the electric supply to the drive motor to produce a variable speed corresponding to that of the reciprocating engine.

21. An input shaft driving unit for use in testing a power transmission drive intended for use with a reciprocating engine having a periodically varying angular velocity, said input shaft driving unit comprising:
   a mounting member;
   an electric drive motor having a drive shaft;
   means for adjustably mounting said drive motor to said mounting member;
   a support member;
   means for adjustably mounting the mounting member to the support member;
   a transfer shaft;
   universal joint means for connecting said transfer shaft to said motor drive shaft; and
   means for connecting said transfer shaft to a power transmission drive to effect an adjustable drive thereof by said electric motor with a variable speed corresponding to that developed by a reciprocating engine.

22. The input shaft drive unit of claim 21 wherein said means for adjustably mounting said drive motor to said mounting member comprises slide means.

23. The input shaft drive unit of claim 21 wherein said means for adjustably mounting said drive motor to said mounting member comprises slide means including rectilinear guide means carried by one of said drive motor and mounting member and slides on the other of said drive and mounting member.

24. The input shaft drive unit of claim 21 wherein said transfer shaft defines an axis of rotation, and said means for adjustably mounting the mounting member to the support member comprises means for angularly adjustably positioning said mounting member relative to the axis of said transfer shaft.

25. The input shaft drive unit of claim 21 wherein said transfer shaft defines an axis of rotation, and said means for adjustably mounting the mounting member to the support member comprises worm means for angularly adjustably positioning said mounting member relative to the axis of said transfer shaft.

26. The input shaft drive unit of claim 21 further including bearing means rotatably mounting the transfer shaft to said support member.

27. The input shaft drive unit of claim 21 wherein one of said means for adjustably mounting the drive motor to said mounting member and said means for adjustably mounting the mounting member to the support member comprises means for effecting angular adjustment therebetween.

28. The input shaft drive unit of claim 21 wherein one of said means for adjustably mounting the drive motor to said mounting member and said means for adjustably mounting the mounting member to the support member comprises means for effecting rectilinear reciprocal adjustment therebetween.

29. The input shaft drive unit of claim 21 further including a base member, and means for adjustably positioning said support member on said base member.

30. The input shaft drive unit of claim 21 further including a base member, means for mounting said power transmission drive to said base member, and means for adjustably positioning said support member on said base member.

* * * * *